United States Patent
Zeng et al.

(10) Patent No.: US 10,371,885 B2
(45) Date of Patent: Aug. 6, 2019

(54) BACKLIGHT MODULE AND DISPLAY APPARATUS

(71) Applicants: SHENZHEN CHINA STAR OPTOELECTRONICS TECHNOLOGY CO., LTD., Shenzhen, Guangdong (CN); WUHAN CHINA STAR OPTOELECTRONICS TECHNOLOGY CO., LTD., Wuhan, Hubei (CN)

(72) Inventors: Jie Zeng, Shenzhen (CN); Wei Guo, Shenzhen (CN)

(73) Assignees: SHENZHEN CHINA STAR OPTOELECTRONICS TECHNOLOGY CO., LTD., Shenzen, Guangdong (CN); WUHAN CHINA STAR OPTOELECTRONICS TECHNOLOGY CO., LTD., Wuhan, Hubei (CN)

( * ) Notice: Subject to any disclaimer, the term of this patent is extended or adjusted under 35 U.S.C. 154(b) by 416 days.

(21) Appl. No.: 14/650,609

(22) PCT Filed: Apr. 15, 2015

(86) PCT No.: PCT/CN2015/076641
§ 371 (c)(1),
(2) Date: Jun. 9, 2015

(87) PCT Pub. No.: WO2016/155037
PCT Pub. Date: Oct. 6, 2016

(65) Prior Publication Data
US 2017/0038522 A1 Feb. 9, 2017

(30) Foreign Application Priority Data
Mar. 30, 2015 (CN) .......................... 2015 1 0145193

(51) Int. Cl.
*F21V 8/00* (2006.01)
(52) U.S. Cl.
CPC ......... *G02B 6/0088* (2013.01); *G02B 6/0051* (2013.01); *G02B 6/0053* (2013.01); *G02B 6/0055* (2013.01)
(58) Field of Classification Search
CPC .. G02B 6/0088; G02B 6/0051; G02B 6/0053; G02B 6/0055
(Continued)

(56) References Cited

U.S. PATENT DOCUMENTS

2003/0043314 A1 3/2003 Lee et al.
2005/0073628 A1* 4/2005 Morsch ............... G02B 6/0088
349/67

(Continued)

FOREIGN PATENT DOCUMENTS

CN 1407380 A 4/2003
CN 1831584 A 9/2006
(Continued)

*Primary Examiner* — Anh T Mai
*Assistant Examiner* — Jessica M Apenteng
(74) *Attorney, Agent, or Firm* — Sughrue Mion, PLLC

(57) ABSTRACT

A backlight module is disclosed. The backlight module includes a reflection sheet including a first body and a second body; a light guide plate disposed on the first body of the reflection sheet; an optical film set disposed on the light guide plate; a plastic frame inside of which the reflection sheet, the light guide plate, and the optical film set are all disposed; and a connecting member configured to fixedly bond the second body to an inner side surface of the plastic frame. The present invention can ensure that the reflection sheet is fixedly bonded on the plastic frame well so that not only can a narrow frame design be achieved, but also the optical films can meet the requirement of fixing strength.

16 Claims, 2 Drawing Sheets

(58) Field of Classification Search
USPC .......................................................... 362/607
See application file for complete search history.

(56) References Cited

U.S. PATENT DOCUMENTS

| | | |
|---|---|---|
| 2007/0126335 A1 | 6/2007 | You et al. |
| 2008/0174730 A1 | 7/2008 | Lee et al. |
| 2013/0128613 A1* | 5/2013 | Tang ................. G02F 1/133308 |
| | | 362/609 |
| 2013/0265519 A1 | 10/2013 | Yu |
| 2014/0133174 A1* | 5/2014 | Franklin .............. H05K 9/0067 |
| | | 362/606 |
| 2014/0301104 A1* | 10/2014 | Lan ...................... G02B 6/0088 |
| | | 362/607 |

FOREIGN PATENT DOCUMENTS

| | | |
|---|---|---|
| CN | 201106806 Y | 8/2008 |
| CN | 102354063 A | 2/2012 |
| CN | 102608788 A | 7/2012 |
| CN | 202927756 U | 5/2013 |
| CN | 103353078 A | 10/2013 |
| CN | 204009290 U | 12/2014 |

* cited by examiner

BACKLIGHT MODULE AND DISPLAY APPARATUS

CROSS REFERENCE TO RELATED APPLICATIONS

This application is a National Stage of International Application No. PCT/CN2015/076641 filed Apr. 15, 2015, claiming priority based on Chinese Patent Application No. 201510145193.4, filed Mar. 30, 2015, the contents of all of which are incorporated herein by reference in their entirety.

BACKGROUND OF THE INVENTION

Field of the Invention

The present invention relates to a field of display technology, and more particularly to a backlight module and a display apparatus.

Description of Prior Art

At the present time, LCD devices are used extensively as display units of electronic apparatus on a variety of electronic products, and borders of these electronic apparatus become increasingly narrow. Since the backlight module is an important component of LCD devices, its borders must also be getting narrower and narrower.

With reference to FIG. 1, a structure of a backlight module provided by the prior art is illustrated, and the backlight module comprises a plastic frame 10, a reflection sheet 20, a light guide plate 30, and an optical film set 40. The reflection sheet 20, the light guide plate 30, and the optical film set 40 are all disposed inside the plastic frame 10. The light guide plate 30 is disposed on the reflection sheet 20, the optical film set 40 is disposed on the light guide plate 30, and the reflection sheet 20 is bonded to a bottom surface of the plastic frame 10 by a double-sided adhesive 50. Owing to the current rapid development of the plastic frame art, however, the width of the plastic frame 10 is further narrowed. When the increasingly narrower plastic frame and the reflection sheet are bonded together by the double-sided adhesive, the bonding strength may be affected by an external forces thereby resulting in unstable bonding between the reflection sheet 20 and the plastic frame 10 and the reflection sheet 20 and the plastic frame are likely to come unstuck or even be apart from each other.

Therefore, there is a need for providing a new solution to solve the foregoing problems.

SUMMARY OF THE INVENTION

The object of the present invention is to provide a backlight module and a display apparatus to solve an existing problem in prior art. That is, when the increasingly narrow plastic frame and the reflection sheet are attached with double-sided adhesive, the fixing strength is affected by an external force resulting in the reflection sheet which is unstably bonded with the plastic frame and easily comes loose and off.

To solve the foregoing problems, the present invention provides a technical solution. According to one aspect of the present invention, a backlight module comprises:

a reflection sheet including a first body and a second body formed integrally, the second body being disposed on a side of the first body, and the first body and the second body defining and embracing an upwardly-opened cavity;

a light guide plate disposed on the first body of the reflection sheet;

an optical film set disposed on the light guide plate;

a plastic frame inside of which the reflection sheet, the light guide plate, and the optical film set are all disposed; and a connecting member configured to fixedly bond the second body to an inner side surface of the plastic frame.

Preferably, the refection sheet in the above backlight module further comprises a third body formed by extending the second body toward an upper surface of the plastic frame, and the third body is fixedly bonded to the upper surface of the plastic frame by the connecting member.

Preferably, the refection sheet in the above backlight module further comprises a fourth body formed by extending the second body toward an outer surface of the plastic frame and the fourth body is fixedly bonded to the outer surface of the plastic frame by the connecting member.

Preferably, the first body, the second body, the third body and the fourth body in the above backlight module are integrally formed.

Preferably, the second body, the third body, and the fourth body in the above backlight module define a semi-enclosed structure with a downward opening and sides of the plastic frame are all boned to inside of the semi-enclosed structure by the connecting member.

Preferably, the light guide plate and the optical film in the above backlight module are disposed in the cavity defined by the first body and the second body.

Preferably, the connecting member in the above backlight module comprises a double-sided adhesive or glue.

Preferably, the optical film set in the above backlight module comprises a diffusion sheet, a lower prism, and an upper prism, and wherein the diffusion sheet is disposed on the light guide plate, the lower prism is disposed on the diffusion sheet, and the upper prism is disposed on the lower prism.

Preferably, the above backlight module further comprises a light emitting diode disposed on the side of the light guide plate.

A display apparatus including a display panel and a backlight module, in which the display panel is disposed relative to the backlight module, and the backlight module comprising:

a reflection sheet including a first body and a second body formed integrally, the second body being disposed on a side of the first body, and the first body and the second body defining and embracing an upwardly-opened cavity;

a light guide plate disposed on the first body of the reflection sheet;

an optical film set disposed on the light guide plate;

a plastic frame inside of which the reflection sheet, the light guide plate, and the optical film set are all disposed; and a connecting member configured to fixedly bond the second body to an inner side surface of the plastic frame.

Preferably, the refection sheet in the above display apparatus further comprises a third body formed by extending the second body toward an upper surface of the plastic frame, and the third body is fixedly bonded to the upper surface of the plastic frame by the connecting member.

Preferably, the refection sheet in the above display apparatus further comprises a fourth body formed by extending the second body toward an outer surface of the plastic frame and the fourth body is fixedly bonded to the outer surface of the plastic frame by the connecting member.

Preferably, the first body, the second body, the third body and the fourth body in the above display apparatus are integrally formed.

Preferably, the second body, the third body, and the fourth body in the above display apparatus define a semi-enclosed structure with a downward opening and sides of the plastic frame are all boned to inside of the semi-enclosed structure by the connecting member.

Preferably, the light guide plate and the optical film in the above display apparatus are disposed in the cavity defined by the first body and the second body.

Preferably, the connecting member in the above display apparatus comprises a double-sided adhesive or glue.

Preferably, the optical film set in the above display apparatus comprises a diffusion sheet, a lower prism, and an upper prism, and wherein the diffusion sheet is disposed on the light guide plate, the lower prism is disposed on the diffusion sheet, and the upper prism is disposed on the lower prism.

Preferably, the above display apparatus further comprises a light emitting diode disposed on the side of the light guide plate.

In comparison with the prior art, the present invention makes the extension portion of the reflective sheet work like a barb to tightly clasp the plastic frame and thereby the reflective sheet does not easily come off from the plastic frame due to the reflective sheet being extended toward the inner side surface of the plastic frame and fixedly bonded to the inner side surface of the plastic frame by double-sided adhesive, being extended toward the upper surface of the plastic frame and fixedly bonded to the upper surface of the plastic frame by double-sided adhesive as well as being outwardly extended toward the outer surface of the plastic frame and fixedly bonded to the outer surface of the plastic frame by double-sided adhesive. Therefore, even though the width of the plastic frame is further narrowed, it is still ensured that the reflection sheet is fixedly bonded on the plastic frame well in order to allow the border of the backlight module to become significantly thinner. Not only can the narrow frame design can be achieved, but also the optical films can meet the requirement of fixing strength at the same time. Furthermore, the utilization of light is raised.

To make the above content of the present invention become more apparent and easily be understood, some preferred embodiments are illustrated in the following detailed description with reference to the accompanying drawings.

DETAILED DESCRIPTION OF THE INVENTION

Regarding the terms used in this specification, one embodiment or "an embodiment" means that the description in connection with the embodiment serves as an example, instance, or illustration of the disclosure. Furthermore, the articles "a" and "an" used in this specification and the appended claims should generally be construed to mean "one or multiple", unless specified or clear from context to be directed to be a singular form.

The display panel of the present invention may be a TFT-LCD (Thin Film Transistor Liquid Crystal Display), an AMOLED (Active Matrix Organic Light Emitting Diode), or other display panels.

In the disclosure, the present invention makes use of arrangements in which a reflective sheet is extended toward an inner side surface of a plastic frame and fixedly bonded to the inner side surface of the plastic frame with double-sided adhesive; the reflection sheet is extended toward an upper surface of the plastic frame and is fixedly bonded to the upper surface of the plastic frame with double-sided adhesive; and the reflective sheet is extended toward an outer side of the plastic frame extension and is fixedly bonded to the outer side of the plastic frame with double-sided adhesive so that an extension portion of the reflective sheet works like a barb to tightly clasp the plastic frame and thereby the reflective film does not easily come off from the plastic frame. An existing problem in the prior art can be solved, that is, when the increasingly narrow plastic frame and the reflection sheet are bonded with double-sided adhesive, the fixing strength is affected by an external forces resulting in the reflection sheet which is unstably bonded with the plastic frame and easily comes loose and off.

To illustrate the technical solution according to the present invention, the specific embodiments will be described as follows.

First Embodiment

Figure 1:
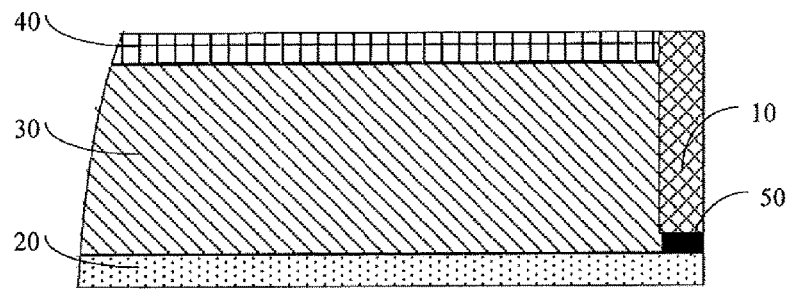
FIG. 1 is a schematic diagram of an exemplary prior art backlight module.
Figure 2:
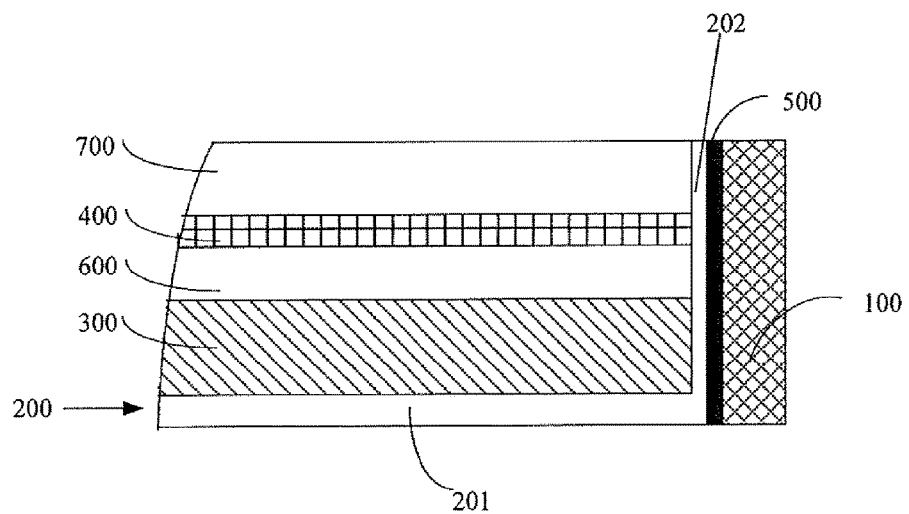
FIG. 2 is a schematic diagram of a backlight module in accordance with a first preferred embodiment.

Referring to FIG. 2, a schematic diagram of a backlight module in accordance with a preferred embodiment provided by the present invention is illustrated. For ease of illustration, merely a portion concerning the embodiment of the present invention is shown.

The backlight module comprises: a plastic frame 100, a reflection sheet 200, a light guide plate 300, an optical film set, and a connecting member 500. The reflection sheet 200 includes a first body 201 and a second body 202, in which the first body 201 and the second body 202 are integrally formed. The second body 202 is disposed on the side of the first body 201, and the first body 201 and the second body 202 define and embrace an upwardly-opened cavity. The light guide plate 300 and the optical film are disposed inside the cavity enclosed by the body 201 and second body 202. The reflection sheet 200, the light guide plate 300, and the optical film set are disposed inside the plastic frame 100. The light guide plate 300 is disposed on the first body 201 of the reflection sheet 200, and the optical film set is disposed on the light guide plate 300. The second body 202 is fixedly bonded together with the inner side surface of the plastic frame 100 by the connecting member 500.

In the embodiment of the present invention, the second body 202 of the reflection sheet 200 is formed by extending the first body 201 to the inner side surface of the plastic frame 100 and fixedly bonding it together with the inner side surface of the plastic frame 100 by the connecting member 500, and as such, the reflection sheet 200 is fixedly bonded on the plastic frame 100 and does not easily come off from the plastic frame 100.

In the embodiment of the present invention, the connecting member 500 may be a material with relatively thin thickness such as double-sided adhesive, glue, or the other thinner materials in order to allow the border of the backlight module to be narrowed down. To further enhance the bonding strength between the plastic frame 100 and the reflective sheet 200, the double-sided adhesive can be mouth-shaped double-sided adhesive.

As a preferred embodiment of the present invention, the optical film set includes: a diffusion sheet 600, a lower prism 400, and an upper prism 700. The diffusion sheet 600 is disposed on the light guide plate 300, and the lower prism 400 is disposed on the diffusion sheet 600 while the upper prism 700 is disposed on the lower prism 400. The diffusion sheet 600, the lower prism 400 and the upper prism 700 are disposed inside the cavity enclosed by the first body 201 and the second body 202. The diffusion sheet 600 can enhance the diffusion effect for uniform backlight light distribution and increase the light transmittance to generate high luminance. Accordingly, the optical film set has the effect of improving the optical performance of the backlight module.

As another aspect of the preferred embodiment, the backlight module further comprises: a light emitting diode (not shown), which is disposed on the side of the light guide plate 300. The light emitting diode provides a light source to the light guide plate 300, and the backlight light emitted by the light-emitting diode sequentially passes through the light guide plate 300 and the optical film set to radiate out. The reflective sheet 200 is configured to make light leaked from the sides of the light guide plate 300 and the optical film set reflect back to improve efficiency in use of light.

As can be seen from the above description, the preferred embodiment allows the reflection sheet to be tightly attached on the plastic frame and thereby prevent the reflection sheet from easily coming off from the plastic frame. Therefore, even if the width of the plastic frame is further narrowed, it is still ensured that the reflection sheet is fixedly bonded on the plastic frame well to allow the border of the backlight module to get significantly thinner. Both the narrow frame design can be achieved and the optical films can meet the requirement of fixing strength at the same time. In addition, the utilization of light is raised.

Second Embodiment

Figure 3:
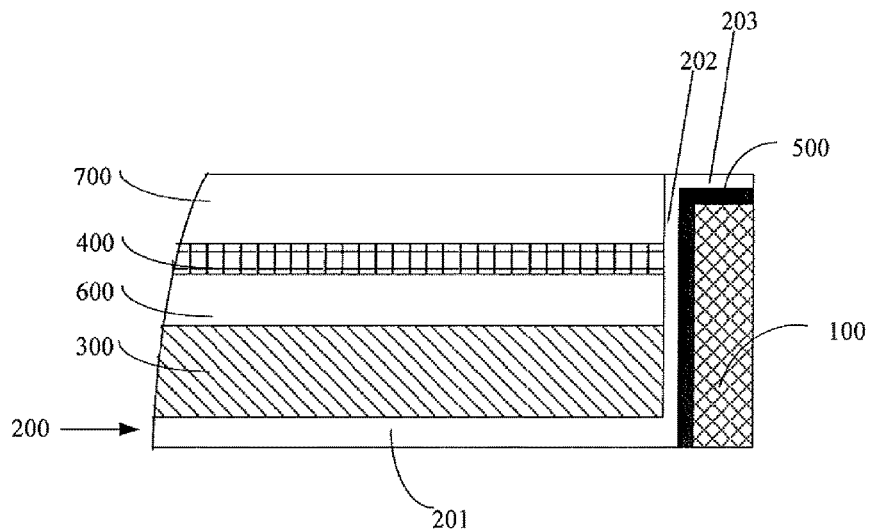
FIG. 3 is a schematic diagram of a backlight module in accordance with a second preferred embodiment.

Referring to FIG. 3, a schematic diagram of a backlight module in accordance with a preferred embodiment provided by the present invention is illustrated. For ease of illustration, merely a portion concerning the embodiment of the present invention is shown. The second embodiment is similar to the first embodiment described above, and the difference is that:

The reflection sheet 200 also includes a third body 203 formed by means of extending the second body 202 toward the upper surface of the plastic frame 100, and the third body 203 is fixedly bonded to the upper surface of the plastic frame 100 by the connecting member 500. The first body 201, the second body 202, and the third body 203 are integrally formed.

In the second embodiment, the reflective sheet works like a barb to tightly clasp the plastic frame and thereby prevent it from easily coming off from the plastic frame because the reflective sheet is extended toward the inner side surface of the plastic frame and fixedly bonded to the inner side surface of the plastic frame by double-sided adhesive as well as the reflection sheet is extended toward the upper surface of the plastic frame and fixedly bonded to the upper surface of the plastic frame by double-sided adhesive. Thus, it still ensures that the reflection sheet is fixedly bonded on the plastic frame to allow the border of the backlight module to become significantly thinner even if the width of the plastic frame is further narrowed. Not only can the narrow frame design be achieved and the optical films can meet the requirement affixing strength at the same time, but also the utilization of light is raised.

Third Embodiment

Figure 4:
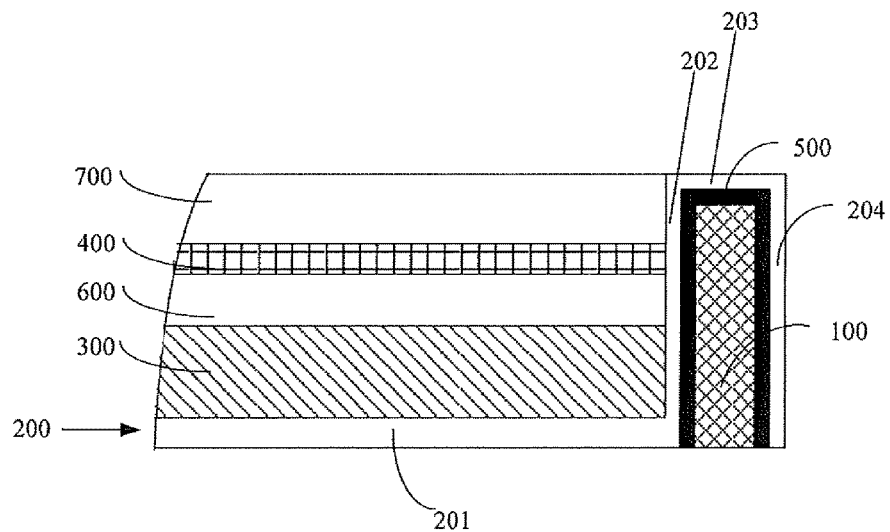
FIG. 4 is a schematic diagram of a backlight module in accordance with a third preferred embodiment.

Referring to FIG. 4, a schematic diagram of a backlight module in accordance with a preferred embodiment provided by the present invention is illustrated. For ease of illustration, merely a portion concerning the embodiment of the present invention is shown. The third embodiment is similar to the second embodiment described above, and the difference is that:

The reflection sheet 200 also includes a fourth body 204 formed by means of extending the third body 203 outwardly to the outer surface of the plastic frame 100, and the fourth body 204 is fixedly bonded to the outer surface of the plastic frame 100 by the connecting member 500. The first body 201, the second body 202, the third body 203, and the fourth body 204 are integrally formed.

In this embodiment, the second body 202, the third body 203 and the fourth body 204 define a semi-enclosed structure with a downward opening. All sides of the plastic frame 100 are bonded to inside the semi-enclosed structure by the connecting member.

In the third embodiment, the reflective sheet works like a barb to tightly clasp the plastic frame and thereby does not easily come off from the plastic frame due to the reflective sheet extended toward the inner side surface of the plastic frame and fixedly bonded to the inner side surface of the plastic frame by double-sided adhesive, additionally the reflection sheet extended toward the upper surface of the plastic frame and fixedly bonded to the upper surface of the plastic frame by double-sided adhesive as well as the reflection sheet outwardly extended toward the outer surface of the plastic frame and fixedly bonded to the outer surface of the plastic frame by double-sided adhesive. Thus, even though the width of the plastic frame is further narrowed, it is still ensured that the reflection sheet is fixedly bonded on the plastic frame well to allow the border of the backlight module to become significantly thinner. Not only can the narrow frame design be achieved, but also the optical films can meet the requirement of fixing strength at the same time. Furthermore, the utilization of light is raised.

Fourth Embodiment

Referring to FIG. 2 through FIG. 4, the present invention further provides a display apparatus. For ease of illustration, merely a portion concerning the embodiment of the present invention is shown. The display apparatus comprises a display panel and a backlight module, and the display panel is disposed relative to the backlight module. According to the present invention, the display panel may be a TFT-LCD (Thin Film Transistor Liquid Crystal Display), an AMOLED (Active Matrix Organic Light Emitting Diode) and so forth, and is constituted by two transparent substrates and liquid crystals sealed therebetween. Furthermore, there are multiple pixels in the display panel for displaying images.

The structure of the backlight module is described in details as follows:

The backlight module comprises: a plastic frame 100, a reflection sheet 200, a light guide plate 300, a connecting member 500, a diffusion sheet 600, a lower prism 400, and an upper prism 700. The reflection sheet 200 includes a first body 201 and a second body 202, in which the first body 201 and the second body 202 are integrally formed. The second body 202 is disposed on the side of the first body 201, and an upwardly-opened cavity is defined by the first body 201 and the second body 202. The light guide plate 300, the diffusion sheet 600, the lower prism 400, and the upper prism 700 are disposed inside the cavity enclosed by the body 201 and second body 202. The reflection sheet 200, the light guide plate 300, the diffusion sheet 600, the lower prism 400 and the upper prism 700 are disposed inside the plastic frame 100. The light guide plate 300 is disposed on the first body 201 of the reflection sheet 200, and the diffusion sheet 600 is disposed on the light guide plate 300. The lower prism 400 is disposed on the diffusion sheet 600, and the upper prism 700 is disposed on the lower prism 400. The second body 202 is fixedly bonded together with the inner side surface of the plastic frame 100 by the connecting member 500.

Further, the reflection sheet 200 also includes a third body 203 formed by means of extending the second body 202 toward an upper surface of the plastic frame 100, and the third body 203 is fixedly bonded to the upper surface of the plastic frame by the connecting member 500. The first body 201, the second body 202 and the third body 203 are integrally formed. Due to the reflective sheet extending toward the inner side surface of the plastic frame and fixedly bonding by double-sided adhesive as well as the reflection sheet extending toward the upper surface of the plastic frame and fixedly bonding by double-sided adhesive, the reflective sheet works like a barb to tightly clasp the plastic frame and thereby does not easily come off from the plastic frame.

Preferably, the reflection sheet 200 also includes a fourth body 204 formed by means of extending the third body 203 outwardly to an outer surface of the plastic frame 100, and the fourth body 204 is fixedly bonded to the outer surface of the plastic frame 100 by the connecting member 500. The first body 201, the second body 202, the third body 203, and the fourth body 204 are all integrally formed. In this embodiment, the second body 202, the third body 203, and the fourth body 204 surround a semi-enclosed structure with a downward opening. All sides of the plastic frame 100 are disposed inside the semi-enclosed structure.

In the embodiment of the present invention, the reflective sheet is extended toward the inner side surface of the plastic frame and fixedly bonded to the inner side surface of the plastic frame by double-sided adhesive, additionally extended toward the upper surface of the plastic frame and fixedly bonded to the upper surface of the plastic frame by double-sided adhesive as well as outwardly extended toward the outer surface of the plastic frame and fixedly bonded to the outer surface of the plastic frame by double-sided adhesive so that the reflective sheet works like a barb to tightly clasp the plastic frame and thereby does not easily come off from the plastic frame. Thus, even though the width of the plastic frame is further narrowed, it is still ensured that the reflection sheet is fixedly bonded on the plastic frame well to allow the border of the backlight module to become significantly thinner. Not only can the narrow frame design be achieved, but also the optical films can meet the requirement of fixing strength at the same time. Furthermore, the utilization of light is raised.

In the embodiment of the present invention, the connecting member 500 may be, e.g. a double-sided adhesive, glue, or other thinner materials, to allow the border of the backlight module to be narrowed down. To further enhance the bonding strength between the plastic frame 100 and the reflective sheet 200, the double-sided adhesive can use a mouth-shaped double-sided adhesive.

As a preferred embodiment of the present invention, the reflection sheet 200 is also extended toward a lower surface of the plastic frame 100 and fixedly bonded to the lower surface of the plastic frame 100 by double-sided adhesive.

As another preferred embodiment of the present invention, the backlight module further comprises: a light emitting diode, which is disposed on the side of the light guide plate 300. The light emitting diode provides a light source to the light guide plate 300, and the backlight light emitted by the light-emitting diode sequentially passes through the light guide plate 300, the diffusion sheet 600, the lower prism 400 and the upper prism 700 to radiate out. The reflective sheet 200 is configured to make light, which is leaked from the sides of the light guide plate 300, the diffusion sheet 600, the lower prism 400, and the upper prism 700, reflect back to improve efficiency in use of light.

As described in the foregoing, the reflective sheet in the embodiments of the present invention works like a barb to tightly clasp the plastic frame and thereby does not easily come off from the plastic frame due to the following arrangements: that the reflective sheet is extended toward the inner side surface of the plastic frame and fixedly bonded to the inner side surface of the plastic frame by double-sided adhesive, extended toward the upper surface of the plastic frame and fixedly bonded to the upper surface of the plastic frame by double-sided adhesive as well as outwardly extended toward the outer surface of the plastic frame and fixedly bonded to the outer surface of the plastic frame by double-sided adhesive. Therefore, even though the width of the plastic frame is further narrowed, it is still ensured that the reflection sheet is fixedly bonded on the plastic frame well to allow out the border of the backlight module to become significantly thinner. Not only can the narrow frame design can be achieved, but also the optical films can meet the requirement of fixing strength at the same time. Furthermore, the utilization of light is raised.

Despite one or more preferred embodiments of the present invention having been illustrated and described, those having ordinary skills in the art may easily contemplate equivalent changes and modifications according to the disclosure and drawings of the present invention. All such modifications and variations are considered to be encompassed in the scope defined by the claims of the present invention. As various changes and modifications could be made, a wide variety of combinations and selections of various elements which have similar functions, even though they have distinct structures, are within the scope of aspects of the disclosure. In addition, although a particular feature relating to a number of embodiments has been disclosed in this specification, this feature may be combined with one or more other features to have other embodiments which are desirable and advantageous to a given or particular application. Moreover, the terms "including", "having", "containing" or variations thereof are used in the detailed description or the claims with a meaning similar to the term "comprising".

In summary, while the present invention has been described with the aforementioned preferred embodiments, it is preferable that the specifications relating to the above embodiments should be construed as exemplary rather than as limitative of the present invention. One of ordinary skill in the art can make a variety of modifications and variations without departing from the spirit and scope of the present invention as defined by the following claims.

What is claimed is:

1. A backlight module comprising:
  a reflection sheet including a first body and a second body formed integrally, the second body being disposed on a side of the first body, and the first body and the second body defining and embracing an upwardly-opened cavity;
a light guide plate disposed on the first body of the reflection sheet;
an optical film set disposed on the light guide plate;
a plastic frame inside of which the reflection sheet, the light guide plate, and the optical film set are all disposed; and
a connecting member configured to fixedly bond the second body to an inner side surface of the plastic frame,
wherein the reflection sheet further comprises a third body formed by extending the second body toward a topmost surface of the plastic frame, and the third body is fixedly bonded to the topmost surface of the plastic frame by the connecting member.

2. The backlight module according to claim 1, wherein the reflection sheet further comprises a fourth body formed by extending the second body toward an outer surface of the plastic frame and the fourth body is fixedly bonded to the outer surface of the plastic frame by the connecting member.

3. The backlight module according to claim 2, wherein the first body, the second body, the third body and the fourth body are integrally formed.

4. The backlight module according to claim 2, wherein the second body, the third body and the fourth body define a semi-enclosed structure with a downward opening and sides of the plastic frame are all boned to inside of the semi-enclosed structure by the connecting member.

5. The backlight module according to claim 1, wherein the light guide plate and the optical film are disposed in the cavity defined by the first body and the second body.

6. The backlight module according to claim 1, wherein the connecting member comprises a double-sided adhesive or glue.

7. The backlight module according to claim 1, wherein the optical film set comprises a diffusion sheet, a lower prism, and an upper prism, the diffusion sheet is disposed on the light guide plate, the lower prism is disposed on the diffusion sheet, and the upper prism is disposed on the lower prism.

8. The backlight module according to claim 1, wherein the backlight module further comprises a light emitting diode disposed on the side of the light guide plate.

9. A display apparatus including a display panel and a backlight module, in which the display panel is disposed relative to the backlight module, and the backlight module comprising:

a reflection sheet including a first body and a second body formed integrally, the second body being disposed on a side of the first body, and the first body and the second body defining and embracing an upwardly-opened cavity;
a light guide plate disposed on the first body of the reflection sheet;
an optical film set disposed on the light guide plate;
a plastic frame inside of which the reflection sheet, the light guide plate, and the optical film set are all disposed; and
a connecting member configured to fixedly bond the second body to an inner side surface of the plastic frame,
wherein the reflection sheet further comprises a third body formed by extending the second body toward a topmost surface of the plastic frame and the third body is fixedly bonded to the topmost surface of the plastic frame by the connecting member.

10. The display apparatus according to claim 9, wherein the reflection sheet further comprises a fourth body formed by extending the second body toward an outer surface of the plastic frame and the fourth body is fixedly bonded to the outer surface of the plastic frame by the connecting member.

11. The display apparatus according to claim 10, wherein the first body, the second body, the third body, and the fourth body are integrally formed.

12. The display apparatus according to claim 10, wherein the second body, the third body and the fourth body define a semi-enclosed structure with a downward opening and sides of the plastic frame are all boned to inside of the semi-enclosed structure by the connecting member.

13. The display apparatus according to claim 9, wherein the light guide plate and the optical film are disposed in the cavity defined by the first body and the second body.

14. The display apparatus according to claim 9, wherein the connecting member comprises a double-sided adhesive or glue.

15. The display apparatus according to claim 9, wherein the optical film set comprises a diffusion sheet, a lower prism, and an upper prism, the diffusion sheet is disposed on the light guide plate, the lower prism is disposed on the diffusion sheet, and the upper prism is disposed on the lower prism.

16. The display apparatus according to claim 9, wherein the backlight module further comprises a light emitting diode disposed on the side of the light guide plate.

* * * * *